W. T. CARNES.
ARTIFICIAL ARM AND HAND.
APPLICATION FILED AUG. 1, 1910.
999,484.
Patented Aug. 1, 1911.
5 SHEETS—SHEET 1.
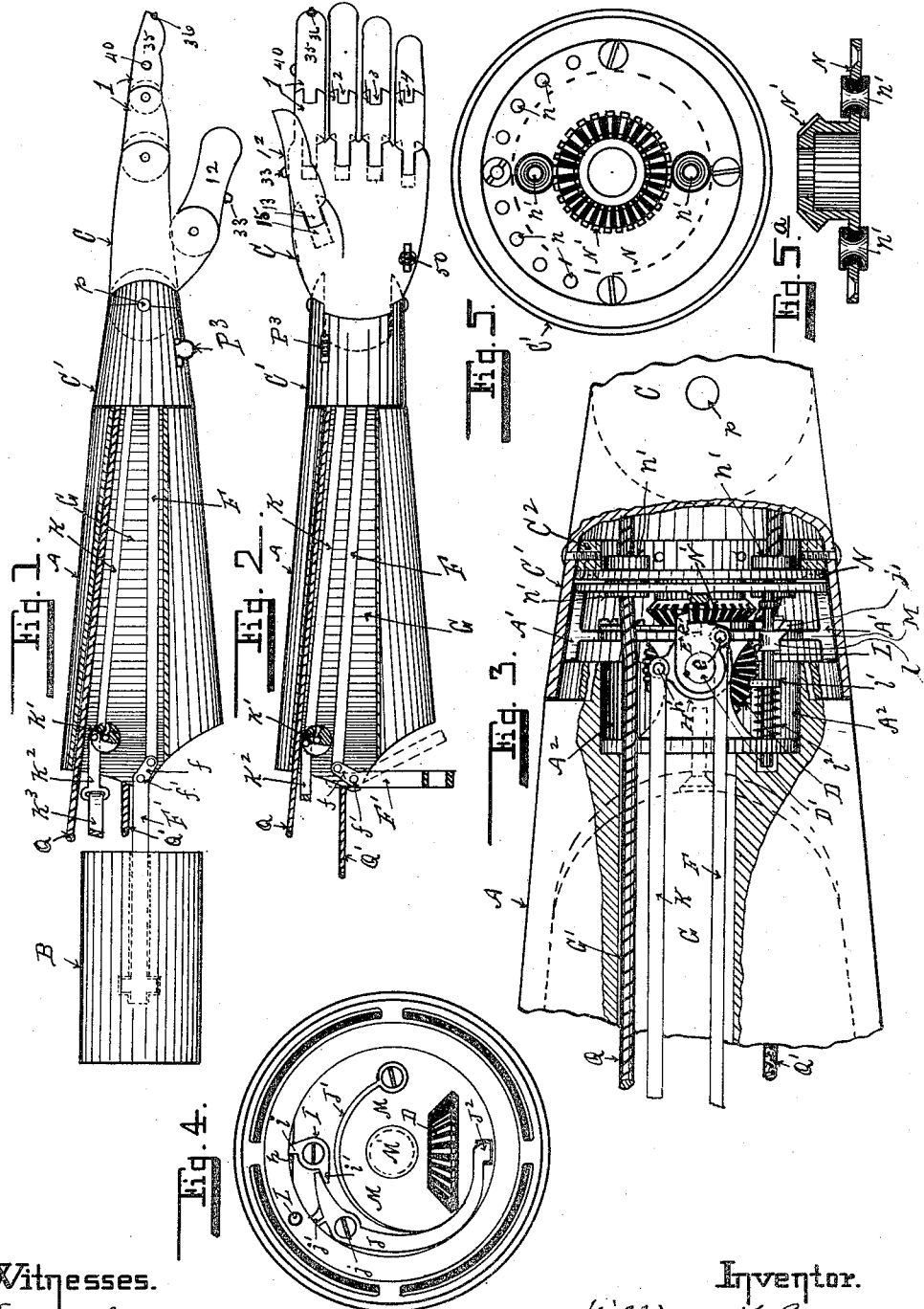
Witnesses.
Inventor.
William T. Carnes

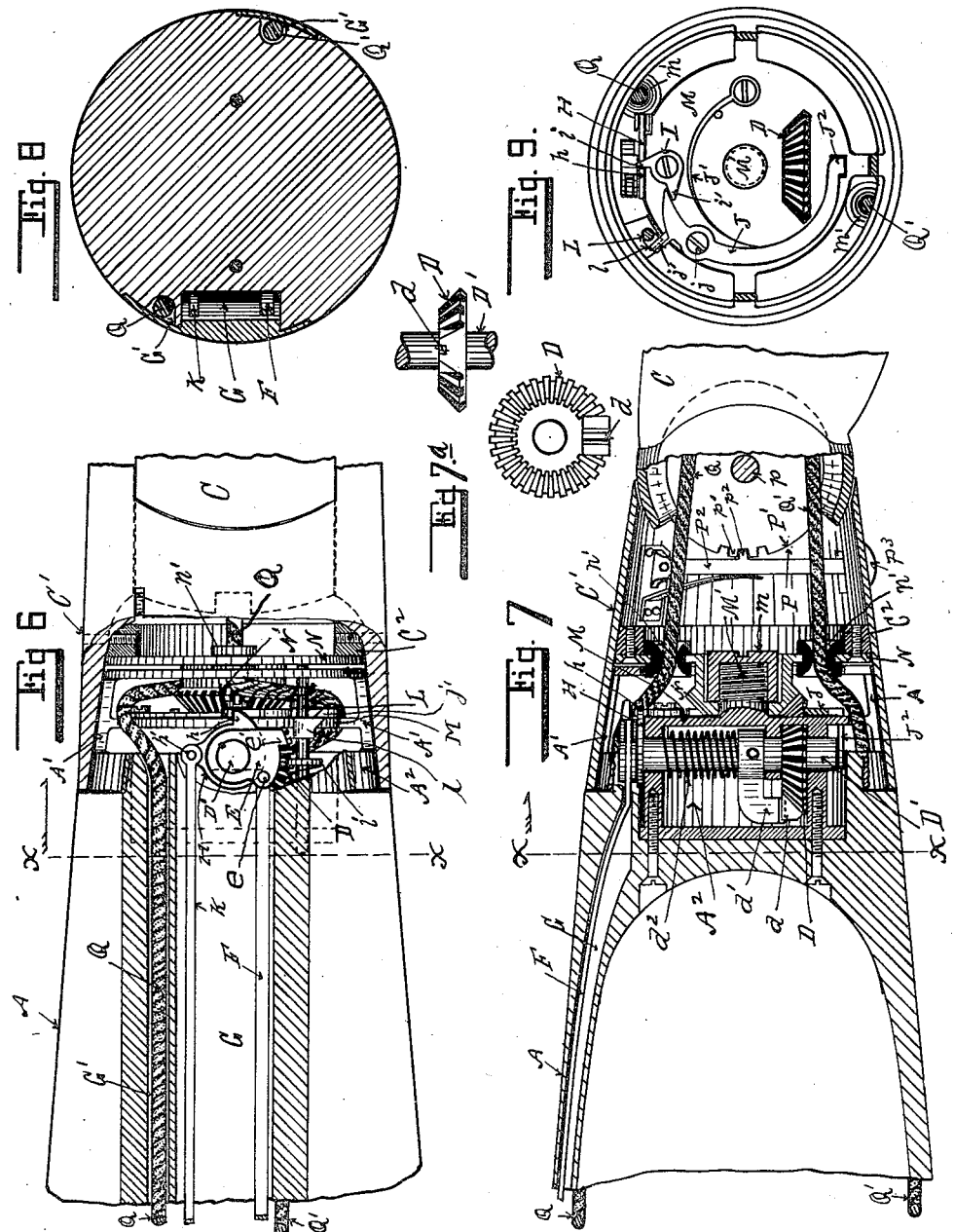

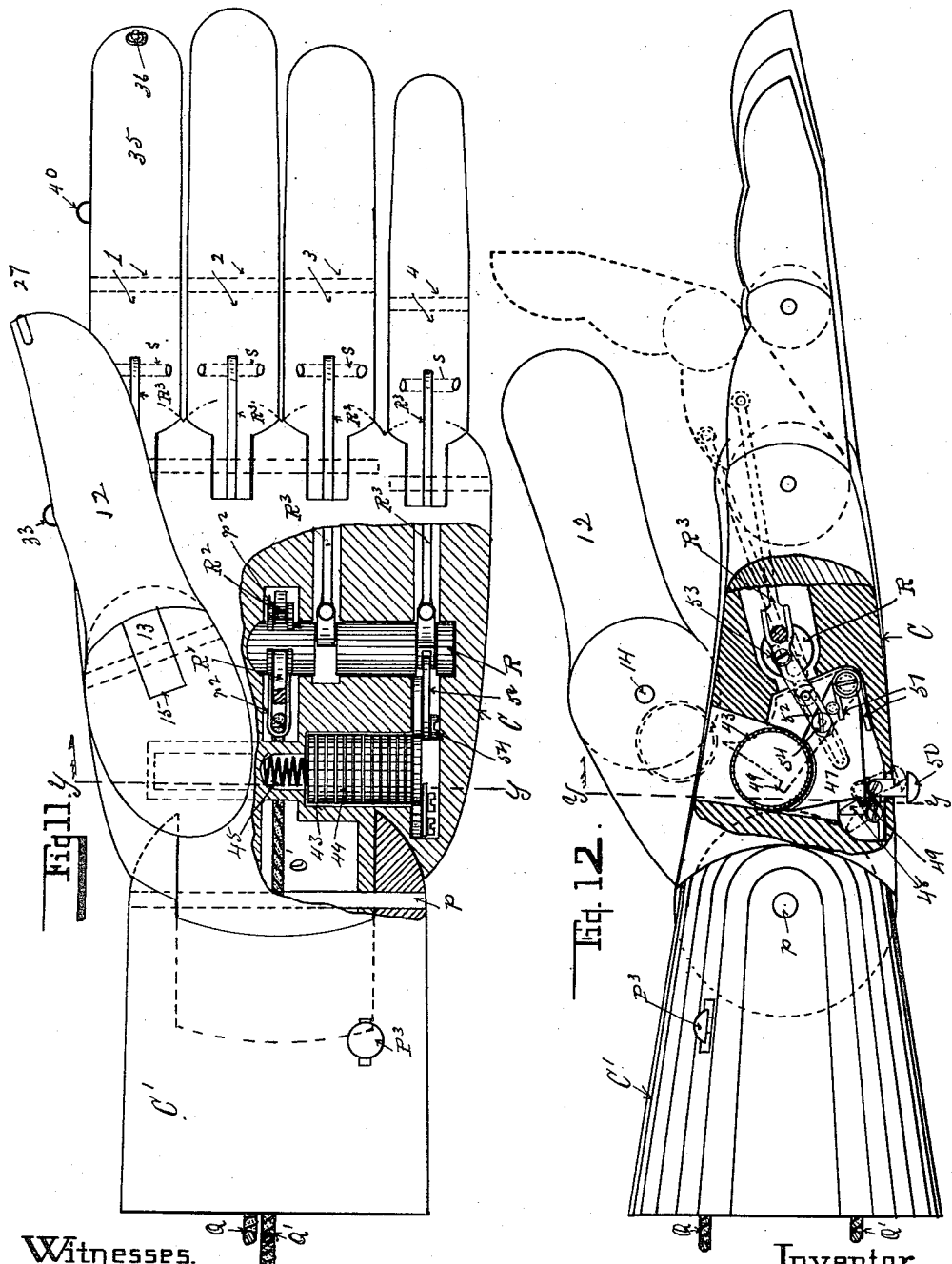

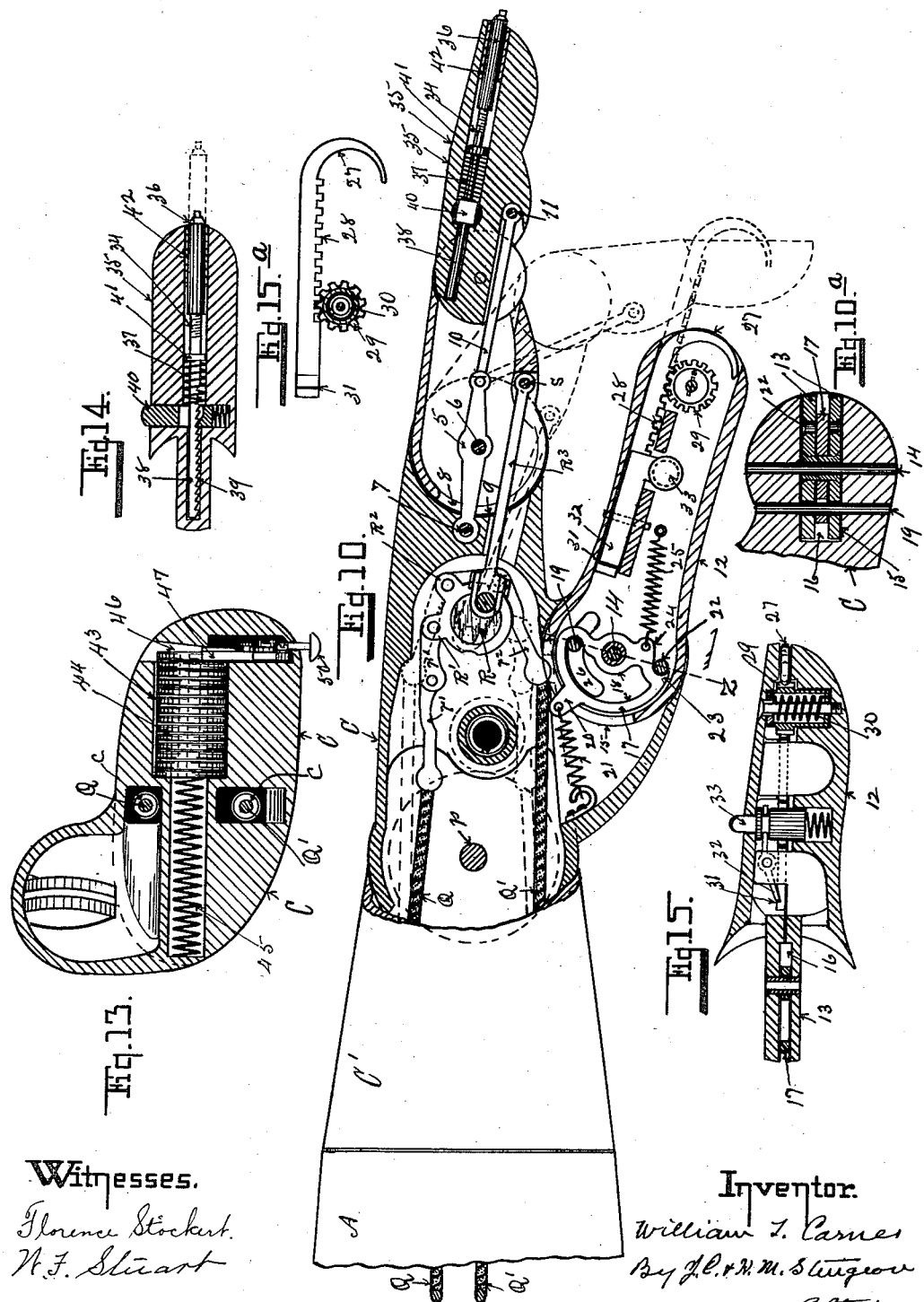

W. T. CARNES.
ARTIFICIAL ARM AND HAND.
APPLICATION FILED AUG. 1, 1910.
999,484.
Patented Aug. 1, 1911.
5 SHEETS—SHEET 5.
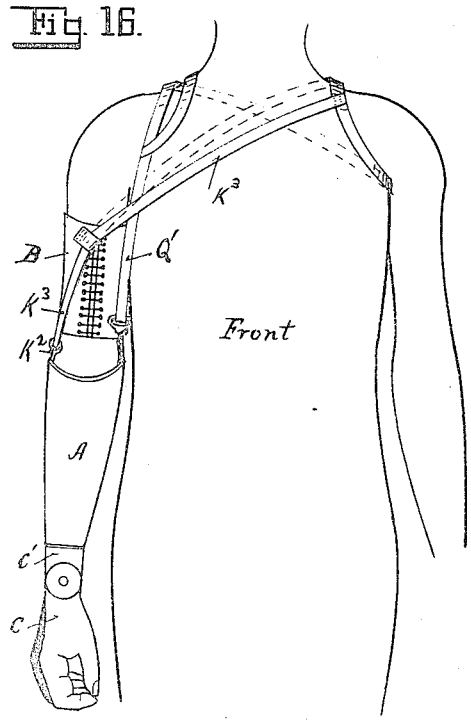
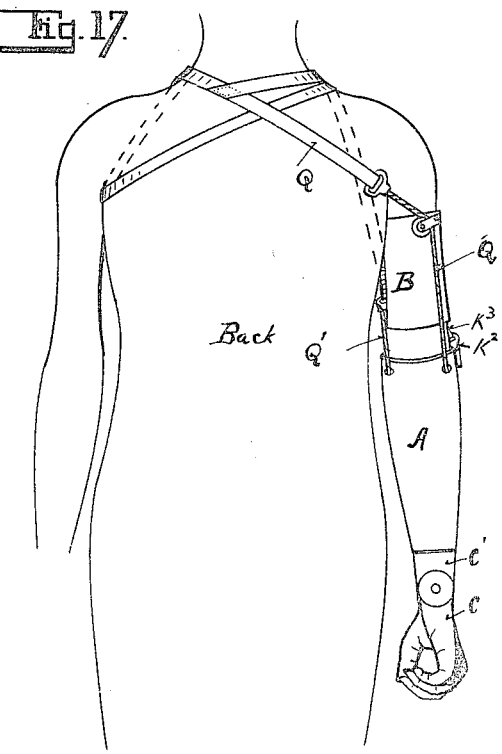
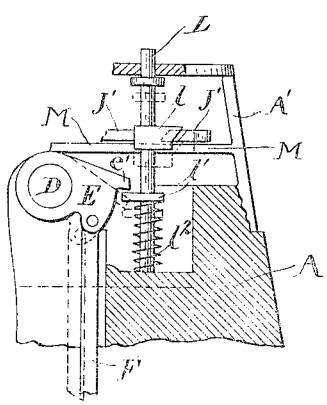
Witnesses.
Inventor.
William T. Carnes

UNITED STATES PATENT OFFICE.

WILLIAM T. CARNES, OF KANSAS CITY, MISSOURI, ASSIGNOR TO CARNES ARTIFICIAL LIMB COMPANY, OF KANSAS CITY, MISSOURI, A CORPORATION OF MISSOURI.

ARTIFICIAL ARM AND HAND.

999,484.   Specification of Letters Patent.   Patented Aug. 1, 1911.

Application filed August 1, 1910. Serial No. 574,964.

*To all whom it may concern:*

Be it known that I, WILLIAM T. CARNES, a citizen of the United States, residing at Kansas City, in the county of Jackson and State of Missouri, have invented certain new and useful Improvements in Artificial Arms and Hands; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to artificial limbs of the type embodied in Letters-Patent No. 760,102, granted on May 17th, 1904, upon my application, and is designed to be an improvement on said invention.

The objects, *inter alia*, of this invention are to produce an artificial arm and hand particularly adapted to be fitted to the fore-arm of the wearer whose elbow joint is in its normal operative condition, and relates to improvements for operating and controlling the rotation of the wrist of the hand upon the fore-arm; also to improvements in the finger operating mechanism, and to other improvements in the hand construction hereinafter described; and while some of the mechanism of this invention is particularly adapted to artificial arms and hands secured to the wearer's fore-arm stump, other features thereof are adapted to be utilized in the construction of artificial arms fitted to the wearer's arm when off above the elbow.

The features of this invention are hereinafter fully set forth and explained, and illustrated in the accompanying drawings, in which:

Figure 1 shows a side view in elevation of my improved arm and hand with a section of the shell of the fore-arm broken away. Fig. 2 shows a view in elevation of my improved arm with the wrist and hand turned and with a section of the shell of the fore-arm broken away. Fig. 3 shows a sectional view of a portion of the fore-arm and wrist mechanism. Fig. 4 shows an end view in elevation of the wrist end of the fore-arm. Fig. 5 shows an end view in elevation of the wrist end of the hand. Fig. 5$^a$ is a sectional detail of the wrist end-plate and bevel gear thereon. Fig. 6 shows another sectional view of a portion of the fore-arm and wrist mechanism. Fig. 7 shows another sectional view of a portion of the fore-arm, wrist mechanism, and of the hand connections. Fig. 7$^a$ shows detail views of the gear wheel in the end of the fore-arm. Fig. 8 shows a transverse section of the fore-arm on the line $x$—$x$ in Figs. 6 and 7. Fig. 9 shows an end view partially in elevation of the wrist end of the fore-arm, with parts removed, so as to show mechanism thereunder. Fig. 10 is a sectional view of the hand through the thumb and fore-finger. Fig. 10$^a$ is a transverse sectional detail of the thumb joint on the line $z$ in Fig. 10. Fig. 11, is a view in elevation of the inside of the hand with a portion thereof broken away. Fig. 12 is another view in elevation of the lower edge of the hand, with parts thereof broken away. Fig. 13 is a transverse section of the hand on the line $y$—$y$ in Figs. 11 and 12, showing the coin pocket mechanism therein. Fig. 14 is a sectional detail of the pencil mechanism in the fore-finger. Fig. 15 is a sectional detail of the hook mechanism in the thumb. Fig. 15$^a$ is a detail view in elevation of the thumb-hook with a sectional view of its actuating gear. Fig. 16, is a front view illustrating the manner in which the operating straps are secured about the shoulders of the wearer. Fig. 17, is a rear view of the same. Fig. 18, is an enlarged detail of the wrist-swivel locking and unlocking mechanism.

In these drawings A indicates a fore-arm hollowed out to receive the stump of a wearer's fore-arm, and B indicates a flexible sleeve adapted to be secured around the upper arm. A′ represents the wrist portion of the fore-arm, C represents the hand and C′ the wrist portion thereof connected with the wrist portion of the fore-arm and adapted to rotate thereon.

In a recess A$^2$ in the end of the wrist part A′ of the fore-arm, there is a bevel-gear D loosely mounted upon a shaft D′ which rotates in suitable bearings in the recess A$^2$.

On one side of the gear D, there is a notch $d$ adapted to be engaged by a catch $d'$ secured to the shaft D′, and a spiral spring $d^2$ on said shaft operates to move the shaft D′ endwise, so as to bring the catch $d'$ into engagement with the notch $d$ on the gear D and cause said gear to rotate in unison with the catch $d'$ and shaft D′. For rotating the shaft D' there is a plate E secured to one end of the shaft D', and to an ear e thereon there is a rod F pivoted which extends through a passage G in the fore-arm A, to an offset f in a rod F' which rod is pivoted to a pivot f' on the upper end of the forearm at a point coinciding substantially with the elbow-joint of the wearer of the arm. From this pivot f' the rod F' extends and is secured to the sleeve B to be secured to the wearer's upper arm, these parts being clearly shown in Figs. 1, 2 and 3, so that the bending of the wearer's elbow-joint operates through the rods F' and F and the plate E to rotate the shaft D'.

On the shaft D' there is loosely mounted another plate or disk H, provided with a shoulder h, adapted to operate through a slot in the plate M of the fore-arm as hereinafter set forth.

On the end-plate M there is pivoted a bell-crank-lever I, and a lever-catch J is also mounted on said plate on a pivot j intermediate of its length. One arm i of the bell-crank-lever I is adapted to be engaged by the shoulder h on the plate or disk H, and the other arm i' of said lever I is adapted to engage and operate the lever catch J.

In the end of the fore-arm there is also provided a spring actuated sliding bolt L one end of which extends outward through the end-plate M, where it is provided with a shoulder l, and on the lever-catch J there is a shoulder j' adapted to engage the shoulder l on the bolt L when the bolt is moved back, and retain it in that position until the lever-catch J is moved back by the action of the bell-crank-lever I. This bolt L is also provided with a collar l' adapted to be engaged by a projection e' on the plate or disk E on the shaft D', which as the plate E and shaft D' are rotated to their extreme point engages the collar l' on the bolt L and moves it backward against its actuating spring l² until the lever-catch J engages the shoulder l thereon and retains it in that position until it is released by the operation of the lever-catch J; this lever-catch J is provided with a spring J' which retains it in engagement until released by the operation of the bell-crank-lever I.

In Fig. 18, I have shown an enlarged view of the wrist-swivel locking and unlocking mechanism, in which the bolt, L, is shown in locking position, during which time the shoulder, j', on the lever-catch, J, is held back by the shoulder, l, on the bolt, L, so that said lever-catch, J, will retain the clutch, d—d', out of engagement, until the bolt, L, is drawn backward by the action of the plate, E, as hereinafter described.

For operating the disk H there is pivoted to an ear h' thereon a rod K which extends through the passage G in the fore-arm A, to and is pivoted upon a rotatable disk K' pivoted upon the fore-arm A near the upper end thereof, and to this disk K' there is pivoted a stirrup K², and from the stirrup K² there is a strap K³ which extends upward to the upper arm or shoulder of the wearer, and therethrough the movement of the upper arm or shoulder operates to actuate the rod K and disk H connected therewith.

The lever catch J above described is also provided with an extension J² which extends inward through an opening in the end plate M and engages the end of the shaft D' and operates, when actuated by the bell-crank-lever I to move the shaft D' longitudinally so as to disengage the catch d' secured thereto from the notch d in the gear D, so that during the movement of the lever-catch J the shaft D' can rotate freely in the gear D. On the center of the end-plate M of the fore-arm A there is an outwardly projecting stud M' which is screw-threaded to receive a screw-threaded sleeve m, as is clearly shown in Fig. 7. The upper part of the wrist portion C' of the hand C is in the form of a tapering sleeve which passes over the lower end A' of the fore-arm A, as is clearly shown in Figs. 3, 6 and 7. In the inside of the wrist section C' there is an internal flange C² and to this flange there is secured a plate N, and projecting outwardly from this plate and integral therewith there is a bevel gear N', shown in Fig. 5ª, which passes down over the stud M' on the end-plate M of the fore-arm, and is secured in place thereon by the screw-threaded sleeve m, so that the bevel-gear N' turns freely on said stud M' and intermeshes with the gear D, as is clearly shown in Fig. 7, so that the rotation of the gear D operates to rotate the gear N' and the wrist and hand to which it is secured, and in the plate N there are holes n into which the end of the sliding bolt L enters to lock the wrist and hand against rotation upon the fore-arm, when desired.

Through the plates M and N are bushed openings m' and n' through which cords Q Q' pass upward through passages G' G' in the shell of the fore-arm up to the upper arm and shoulder of the wearer, and downward through the wrist C' and through passages c c in the hand C to the finger operating mechanism of the hand hereinafter described, so that the fingers can be actuated by the movement of the upper arm or shoulder of the wearer.

The hand C is hinged to the wrist portion C' by means of a socket P formed in the wrist member C' and a rounded end P' on the hand member which fits into the sockets P and is secured therein by a pintle p, so that a limited movement of said joint is obtained. In this wrist member C' there is a spring actuated lever stop P² having a tooth $p^2$ thereon which is adapted to engage teeth $p'$ on the rounded end $P'$ of the hand member. One end $P^3$ of the lever $P^2$ extends out through the shell of the wrist member $C''$ whereby it can be released from engagement when desired.

In the body of the hand C, I mount a rock-shaft R provided with ears $R'$ and $R^2$ and from the ear $R'$ a link $r'$ connects with the cord Q, and from the ear $R^2$ thereon links $r^2$ connect around the shaft R in the opposite direction with the cord $Q'$, so that the cord Q will rotate the shaft in one direction and the cord $Q'$ will rotate it in the opposite direction.

The fingers, 1, 2, 3 and 4, are hinged to the hand body C by means of socket joints, substantially like the joints between the wrist and hand body members hereinbefore described, and each of said fingers is provided with a like intermediate joint, so that each finger consists of two members hinged together. From cranks on the rock-shaft R connecting rods $R^3$ extend to and are pivoted upon pintles $s$ in and near the inner faces of the finger sections hinged to the hand-body C, so that the rotation of the rock-shaft R in one direction or the other operates to open or close the sections of the fingers hinged to the hand-body C. In each of the joints between the fingers and the hand-body C there is a bar 5 through which the pintle 6 of the finger joint passes, and one end of this bar 5 extends into the hand-body and is secured by means of a rod 7 which passes therethrough, and a slot 8 is made in the rounded end 9 of the finger section so as to allow it to turn in its socket without interference from the bar 5. To the opposite end of the bar 5 in each finger joint there is pivoted a link 10 which has its opposite end pivoted upon a pintle 11 in and near the inner face of each finger, so that when the inner sections of the fingers are operated to close or open them, the outer sections of the fingers also close or open, as illustrated by dotted lines in Fig. 10.

The thumb 12 is provided with a slotted extension 13 which is pivoted on a pintle 14 in a socket 15 in the hand body C, and in the slot 16 in the extension 13 there is mounted on the pintle 14 a slotted plate 17, and through the slot 18 therein a stationary pin 19 passes and also passes through a transverse slot 26 in the thumb extension 13, and from an ear 20 on said plate a spiral spring 21 extends backward and is secured to the inside of the hand-body, and in the slotted thumb extension 13, there is a rivet 22, with which a projection 23 on the plate 17 contacts, so as to limit the movement of said plate in one direction with relation to the movement of the thumb 12 and to an ear 24 on said plate 17 a spiral spring 25 extends into the thumb, which operates to normally retain the projection 23 in contact with the rivet 22. The springs 20 and 25 connected with the plate 17 operate to yieldingly sustain the thumb 12 against any pressure exerted thereon, and yet allow it to be moved in and out when sufficient pressure is applied.

In a slot formed in the thumb 12 there is a hook 27, shown in Figs. 10, 15 and 15$^a$. This hook is provided with a rack 28, which intermeshes with a pinion 29 provided with a spring 30 which operates to rotate the gear 29, so as to project the hook 27 from the end of the thumb 12, as shown in dotted lines in Fig. 10. To retain the hook 27 in a closed position a notch 31 is provided with which a spring actuated dog 32 engages to hold the hook 27 in its inward position. For releasing the dog 32, a stud 33 is connected therewith which extends out through the surface of the thumb as shown in Figs. 11 and 15, which stud, when depressed raises the dog 32 and releases the hook 27, so that the spring actuated gear 29 moves the hook out of the thumb ready for use, and when the hook is not in use it is pushed back to the position shown in Figs. 10 and 15 where it is retained by the dog 32 until again released.

In a tubular recess 34 in the outer section 35 of the fore finger 1 there is a pencil holder 36 provided with a spiral spring 37 for moving it outward. The stem 38 of the pencil-holder 36 is provided with a rack 39 with which a spring actuated dog 40 engages to retain the pencil-holder 36 within the finger section 35. The stud 40 projects beyond the surface of the finger so that it can be depressed to release the pencil-holder 36 and allow it to be moved outward by the spring 37 until the collar 41 thereon contacts with the end of the bushing 42, all of which mechanism is shown in Figs. 10 and 14.

In the body C of the hand there is a coin recess 43 clearly shown in Figs. 11 and 13, adapted to contain coins 44, and extending upward therefrom there is a spiral spring 45 adapted to press downward upon the coins in said recess, and in the lower part of the inside of the hand body C there is a slot 46 opening into the bottom of said recess through which coins can be inserted into and discharged from said recess 43. In the slot 46 there is a plate 47 normally retained in the position shown by a spring actuated dog 48, engaging with a lug 49 thereon; this dog 48 being provided with an operating knob 50 which extends out of the surface of the hand body. The plate 47 is provided with a spring 51 which operates said plate in one direction to throw out a coin, and it is operated in the other direction to return it to its normal position, by means of a slotted link 52, pivoted at one end to a stud 53 on the rear end of the connecting rod R³, while the slot therein engages a stud 54 on the plate 47, as illustrated in Figs. 11 and 12, so that the plate 47 can be returned to its normal position by the closing of the fingers of the hand as illustrated by dotted lines in Fig. 12.

In operation when the fore-arm, A, is secured to the stump and the sleeve, B, is laced over the upper arm of the wearer, the cords and their strap extensions, Q and Q′, by means of which the fingers are opened and closed, are secured about the wearer's shoulders, as shown in Figs. 16 and 17, the strap, Q′, passing upward over the maimed shoulder and across the back, then under the opposite arm, and then up and over the shoulder (the left shoulder in Figs. 16 and 17), and then across the back to and terminating in the cord, Q. These cords, Q and Q′, extend, as hereinbefore described, down through the fore-arm and wrist and into the hand where they are connected with and operate the transverse crank-shaft as and for the purpose hereinbefore set forth. The cords, Q and Q′, also, when the latch, P³, (see Fig. 7) is opened will flex the wrist joint on the pivot, p, without operating the fingers, because the wrist joint is easier to operate than the fingers are. The strap, K³, extends from the link, K², diagonally across the breast to and is attached to the strap, Q—Q′, in front of the left shoulder, as shown in Fig. 16. This strap, K³, as hereinbefore described, is for the purpose of releasing the wrist swivel locking bolt, L, (shown in Figs. 3, 6 and 9) so that the end thereof will slide into one of the holes, n, in the plate, N, secured in the wrist portion of the hand and thereby prevent it from rotating on its pivot, M′ (see Figs. 7 and 9) as hereinbefore described. The wrist swivel is now normally locked, and the clutch, d—d′, of the rotating mechanism is open, or disengaged as hereinbefore described, so that the shaft, D′, will freely rotate in the miter gear, D. When it is desired to bend the wrist joint so as to move the palm of the hand inward toward the fore-arm, the latch, P³, is pressed backward, and a slight stress put upon the cord, Q′, by means of lowering the maimed shoulder, which will cause the wrist joint to flex inward when it may be latched at such angle as may be desired by means of the latch, P³. Likewise a strain on the cord Q, when the latch P³, is opened, will cause a backward flexing of the wrist joint. When it is desired to close the fingers of the hand about the handle of a basket or other article, a more pronounced dropping of the maimed shoulder will put a greater strain on the cord, Q′, which will cause the crank-shaft, R, to make a semi-rotation, thereby, through the links, R³, causing the fingers to assume the position thereof shown by broken lines in Fig. 10, when the chain link, r′, to which the cord Q, is attached will contact with the wall of the back of the hand, C, as is shown by broken lines in said Fig. 10, thereby preventing the further rotation of said crank-shaft, and as the cranks in said shaft have stopped slightly past the center of the shaft, any strain on the closed fingers tends to hold the shaft from rotating backward. When it is desired to open the fingers the left shoulder (the one opposite the maimed arm) is thrust forward, which strains the strap across the back and cord, Q, which causes the shaft, R, to the upper side of which said cord is attached, to rotate back to the position thereof shown by full lines in Fig. 10, which causes the fingers of the hand to again open. When it is desired to unlock the wrist swivel, the elbow joint is bent so that the rod, F′, (see Figs. 1 and 2) is bent to the position thereof shown by broken lines in Fig. 2, which through the rod, F, causes the shoulder, e′, on the plate, E, to engage the shoulder, l′ on the sliding bolt, L, and force the same to move backward, out of engagement with the hole, n, in the plate, N, which movement of the bolt, L, carries with it the collar, l, down below the catch j′, thereby releasing the lever, J, (see Fig. 9) so as to permit the clutch, d—d′ to become intermeshed, when the rod, F, is reciprocated by the action of the rod, F′, which will cause the shaft, D′, and miter-gear D, to rotate thereby causing the miter-gear, N′, and the wrist, C′, to rotate upon the pivot, M. By means of this wrist swivel operating mechanism the artificial hand when placed palm down upon a table by the wearer, automatically turns on the wrist swivel when the hand is raised to the face, so that the palm of the hand will be toward the face, as is done by the natural hand.

Having thus shown and described my invention so as to enable others to construct and utilize the same what I claim as new and desire to secure by Letters-Patent is:

1. In an artificial arm, the combination of a fore-arm member, a sleeve member to be secured to the upper arm, a wrist member secured to the fore-arm member by a swivel joint, gear mechanism in said joint for rotating said wrist member upon the fore-arm member, rod mechanism operatively connected with and extending from said gear mechanism to the upper end of the fore-arm member, a rod secured to said sleeve and extending downward to a pivot on the upper end of the fore-arm member, and an offset in said rod pivoted to the upper end of the rod in the fore-arm member, whereby the bending of the elbow of the wearer operates said gearing to rotate the wrist member upon the fore-arm member, substantially as set forth.

2. In an artificial arm the combination of a sleeve member to be secured to the upper arm, a fore-arm member to be secured on the stump of the wearer's fore arm, a wrist member secured to the end of the fore-arm member by a swivel joint, a bevel-gear on the wrist member, a transverse shaft in the end of the fore-arm member, a bevel-gear thereon intermeshing with the bevel gear on the end of the wrist member, a rod connected with and adapted to rotate said shaft extending to the upper end of the fore-arm member, a rod secured to said sleeve and pivoted to the upper end of the fore-arm member, and an offset on said rod pivoted to the upper end of the rod in the fore-arm member substantially as set forth.

3. In an artificial arm the combination of a sleeve member to be secured to the upper arm, a fore-arm member to be secured to the stump of the wearer's fore-arm, a wrist member secured to the end of the fore-arm member by a swivel-joint, a bevel gear on the end of the wrist member, a transverse shaft in the end of the fore-arm member, a bevel gear thereon intermeshing with the bevel gear on the end of the wrist member, a clutch on said transverse shaft, a rod connected with and adapted to rotate said shaft extending to the upper end of the fore-arm member, a rod secured to said sleeve and pivoted to the upper end of the fore-arm member, an offset on said rod pivoted to the upper end of the rod in the fore-arm member, spring actuated locking mechanism to prevent the rotation of the wrist member upon the fore-arm member, a bell-crank lever-disk mounted on said transverse shaft, a bell-crank lever pivoted on the fore arm member and adapted to be operated by said bell-crank lever-disk, a lever-catch on the end of said fore-arm member adapted to be operated by said bell-crank lever to release said locking mechanism and disengage the clutch on said transverse shaft, a rod pivoted to said bell-crank lever-disk and extending upward in the fore-arm member, and strap mechanism attached to and extending therefrom over the shoulders of the wearer for operating said mechanism, substantially as set forth.

4. The combination in an artificial arm and hand, of a fore-arm, a wrist member pivoted to the lower end thereof, mechanism for rotating said wrist member upon the fore-arm, a hand-body hinged to the wrist member, a rock-shaft in the hand-body, fingers hinged upon the hand-body, double cord mechanism connected to said rock-shaft and extending therefrom through the hand body, wrist, and fore-arm to the shoulder of the wearer, and links extending from said rock-shaft to the fingers, substantially as set forth.

5. The combination in an artificial arm and hand, of a fore-arm, a wrist pivoted thereto, mechanism for rotating said wrist upon the fore-arm, mechanism for stopping the rotation of the wrist and for releasing it, a hand-body hinged to the wrist, a rock-shaft in the hand-body, cords so attached to opposite sides of said rock-shaft as to rotate it in opposite directions, extending through the hand, wrist and fore-arm and up to the shoulder of the wearer, and links pivoted to the rock-shaft and to the fingers, substantially as set forth.

6. The combination in an artificial hand, of a coin receptacle, a hinged plate for discharging a coin therefrom, a rock-shaft mounted in said hand body, means for rotating said rock-shaft, and link mechanism connecting said rock-shaft and said hinged plate, substantially as set forth.

7. The combination in an artificial hand, of a rock-shaft mounted therein, means for rotating said rock-shaft in either direction, inner finger sections hinged to said hand, links pivoted to said rock-shaft and to said inner finger sections, longitudinal bars in the joints between said finger sections and the hand body, outer finger sections hinged to said inner finger sections, and links pivoted to the outer ends of said bars, and to the outer finger sections, substantially as set forth.

8. The combination in an artificial hand of a thumb hinged thereto, slotted plate and spring mechanism in said joint, so as to hold the thumb yieldingly in both directions, substantially as set forth.

9. The combination in an artificial arm and hand, of a fore-arm member adapted to be secured upon the stump of the arm of the wearer, an artificial hand hinged to the lower end thereof, a cord leading from back portion of said artificial hand up through said fore-arm member, and another cord leading from the front part of said artificial hand up through said fore-arm member, whereby said wrist hinge may be operated, substantially as set forth.

In testimony whereof I affix my signature, in presence of two witnesses.

WILLIAM T. CARNES.

Witnesses:
JOHN C. MEREDITH,
ESTHER LIEBERMAN.